United States Patent
Bamji et al.

(10) Patent No.: US 8,139,141 B2
(45) Date of Patent: Mar. 20, 2012

(54) SINGLE CHIP RED, GREEN, BLUE, DISTANCE (RGB-Z) SENSOR

(75) Inventors: Cyrus Bamji, Fremont, CA (US);
Peiqian Zhao, Palo Alto, CA (US)

(73) Assignee: Microsoft Corporation, Redmond, WA (US)

(*) Notice: Subject to any disclaimer, the term of this patent is extended or adjusted under 35 U.S.C. 154(b) by 289 days.

(21) Appl. No.: 11/044,996

(22) Filed: Jan. 26, 2005

(65) Prior Publication Data

US 2005/0285966 A1 Dec. 29, 2005

Related U.S. Application Data

(60) Provisional application No. 60/540,523, filed on Jan. 28, 2004.

(51) Int. Cl.
| | |
|---|---|
| G03B 13/00 | (2006.01) |
| H04N 9/07 | (2006.01) |
| H04N 5/225 | (2006.01) |
| H04N 13/02 | (2006.01) |
| G01C 3/08 | (2006.01) |

(52) U.S. Cl. ......... 348/348; 348/49; 348/335; 348/342; 356/5.01; 356/5.04

(58) Field of Classification Search .................. 348/274, 348/275, 336, 337, 348, 349, 350; 356/5.01–5.08
See application file for complete search history.

(56) References Cited

U.S. PATENT DOCUMENTS

| | | | | |
|---|---|---|---|---|
| 5,621,460 A | * | 4/1997 | Hatlestad et al. ............. | 348/265 |
| 5,699,149 A | * | 12/1997 | Kuroda et al. ............... | 356/4.01 |
| 5,920,347 A | * | 7/1999 | Aoki ............................. | 348/339 |
| 6,020,994 A | * | 2/2000 | Cook ............................ | 359/365 |
| 6,094,281 A | * | 7/2000 | Nakai et al. .................... | 358/512 |
| 6,323,942 B1 | | 11/2001 | Bamji | |
| 6,456,793 B1 | * | 9/2002 | Ray et al. ......................... | 396/89 |
| 6,502,053 B1 | * | 12/2002 | Hardin et al. ................. | 702/143 |
| 6,512,838 B1 | | 1/2003 | Rafii et al. | |
| 6,515,470 B2 | | 2/2003 | Suzuki et al. | |
| 6,515,740 B2 | * | 2/2003 | Bamji et al. ............... | 356/141.1 |
| 6,522,395 B1 | | 2/2003 | Bamji et al. | |
| 6,538,751 B2 | * | 3/2003 | Ono ............................. | 356/614 |
| 6,580,496 B2 | | 6/2003 | Bamji et al. | |

(Continued)

OTHER PUBLICATIONS

Response to Office Action filed Oct. 13, 2011, U.S. Appl. No. 12/004,305, filed Dec. 20, 2007.

(Continued)

*Primary Examiner* — David Ometz
*Assistant Examiner* — Dillon Durnford Geszvain
(74) *Attorney, Agent, or Firm* — Vierra Magen Marcus & DeNiro LLP

(57) ABSTRACT

An RGB-Z sensor is implementable on a single IC chip. A beam splitter such as a hot mirror receives and separates incoming first and second spectral band optical energy from a target object into preferably RGB image components and preferably NIR Z components. The RGB image and Z components are detected by respective RGB and NIR pixel detector array regions, which output respective image data and Z data. The pixel size and array resolutions of these regions need not be equal, and both array regions may be formed on a common IC chip. A display using the image data can be augmented with Z data to help recognize a target object. The resultant structure combines optical efficiency of beam splitting with the simplicity of a single IC chip implementation. A method of using the single chip red, green, blue, distance (RGB-Z) sensor is also disclosed.

18 Claims, 5 Drawing Sheets

U.S. PATENT DOCUMENTS

| | | | |
|---|---|---|---|
| 6,587,186 B2 | 7/2003 | Bamji et al. | |
| 6,614,422 B1 | 9/2003 | Rafii et al. | |
| 6,674,895 B2 | 1/2004 | Rafii et al. | |
| 6,678,039 B2 | 1/2004 | Charbon | |
| 6,690,354 B2 | 2/2004 | Sze | |
| 6,856,355 B1 * | 2/2005 | Ray et al. | 348/370 |
| 6,906,793 B2 | 6/2005 | Bamji et al. | |
| 6,915,196 B2 | 7/2005 | Rao et al. | |
| 6,919,549 B2 | 7/2005 | Bamji et al. | |
| 7,110,028 B1 * | 9/2006 | Merrill | 348/294 |
| 7,129,462 B2 * | 10/2006 | Hogan et al. | 250/214 VT |
| 7,259,375 B2 * | 8/2007 | Tichit et al. | 250/341.8 |
| 7,560,679 B1 * | 7/2009 | Gutierrez | 250/208.1 |
| 2003/0136980 A1 * | 7/2003 | Lin | 257/215 |
| 2004/0046744 A1 | 3/2004 | Rafii et al. | |
| 2004/0169749 A1 | 9/2004 | Acharya | |
| 2004/0183940 A1 | 9/2004 | Raskar | |
| 2007/0201859 A1 * | 8/2007 | Sarrat | 396/322 |

OTHER PUBLICATIONS

Office Action dated Jun. 20, 2011, U.S. Appl. No. 12/004,305, filed Dec. 20, 2007.

Response to Office Action filed Sep. 29, 2011, U.S. Appl. No. 11/444,947, filed Jun. 1, 2006.

Notice of Allowance and Fee(s) Due dated Jan. 3, 2012, U.S. Appl. No. 11/444,947, filed Jun. 1, 2006.

Notice of Allowance and Fee(s) Due dated Jan. 12, 2012, U.S. Appl. No. 12/004,305, filed Dec. 20, 2007.

* cited by examiner

SINGLE CHIP RED, GREEN, BLUE, DISTANCE (RGB-Z) SENSOR

CROSS-REFERENCES TO RELATED APPLICATIONS

This application claims priority to U.S. Provisional Patent Application No. 60/540,523 filed Jan. 28, 2004 and entitled Single Chip RGBZ Sensor, the entire contents of which is incorporated herein by this reference.

BACKGROUND OF THE INVENTION

1. Field of the Invention

The invention relates generally to solid state sensors, and more specifically to such sensors that can be implemented on a single integrated circuit chip, and respond to luminosity information in a first spectral band such as red, green, blue optical wavelengths (which shall be understood to include black and white) to acquire an red-green-blue (RGB) image, and respond to wavelengths in a second spectral band, preferably near-infrared (NIR), to acquire Z data.

2. Description of Related Art

Luminosity-based sensors are known in the art. Such sensors are commonly implemented using CMOS techniques and include an array of pixel detectors responsive to wavelengths in a first spectral band, e.g. red, green, blue wavelengths (RGB sensors) or simply gray scale wavelengths (black and white or BW sensors). The array can be fabricated upon an integrated circuit (IC) substrate upon which may be fabricated analog-to-digital conversion circuitry and signal processing circuitry. While such sensors can provide a color (RGB) or gray scale (BW) image, they provide no useful depth information.

FIG. 1 depicts an exemplary application of a conventional RGB or BW sensor. Suppose that it is desired to use a camera system to intelligently recognize objects within a field of view. In some applications the camera system might be provided in or on a motor vehicle to scan the road ahead for target objects that might be endangered by the motor vehicle, pedestrians perhaps. An exemplary camera system includes a lens 20 that receives red, green, and blue components of visible light energy 30 reflected from a target object 40 a distance Z away from the camera system. Associated with the camera system is a prior art RGB sensor 50 that outputs a signal responsive to the incoming RGB light components. In this particular application, a sensor circuit 60 receives an output signal from sensor 50 and attempts to identify the target object 40 in terms of hazard potential. If desired, output from the camera system may include an image 70 electronically generated, for example on a flat screen monitor screen (or in some applications printed on media such as paper). In a hazard warning application image 70 might be displayed within a red circle to designate an immediate hazard to be avoided, and sensor circuit 60 may also cause audible warnings to be sounded.

Although resolution of RGB sensor 50 may be adequate to display target object 40, rapid identification of the nature and size of the target would be improved if Z data, usually acquired from IR wavelengths, could also be used. Such information, if available, could also be used to provide a measure of the actual size of the target object.

It is also known in the art to fabricate range-finding or three-dimensional sensors. For example, U.S. Pat. No. 6,515,740 to Bamji et al. (issued Feb. 4, 2003) discloses a sensor system that provides depth information (Z-distance between the sensor and a target object) at each pixel detector in the sensor array. Range-finding detectors according to the '470 patent use a modulated light source operating at preferably near infrared wavelength (perhaps 800 nm). As used herein, let it be understood that the term "RGB" may include "gray scale" or "BW" wavelengths, and that the term "IR" may include "near IR" (NIR) wavelengths.

In many applications it can be important to simultaneously acquire from a single field of view or bore sight both data in a first spectral band, typically RGB data (used to provide an RGB image) and Z data (preferably acquired at in a second spectral band, typically IR wavelengths). But this goal is difficult to attain in practice because pixel detectors used to capture Z-data at IR wavelengths are commonly much larger in area than pixel detectors responsive to RGB wavelengths. For example the cross-sectional area of an exemplary Z-data pixel detector might be 50 μm×50 μm, compared to an exemplary area of perhaps 5 μm×5 μm for an RGB pixel detector. If a single array were fabricated to simultaneously use RGB pixel detectors and Z pixel detectors, the presence of the large sized Z pixel detectors in a high density array of much smaller sized RGB pixel detectors would cause large image artifacts that could degrade the quality of a resultant RGB image. Further, pixel detectors responsive to Z data often require high quality (preferably IR wavelength) bandpass filtering. In practice, CMOS fabrication does not presently implement such bandpass filtering for the Z pixels, especially with desired narrow band characteristics that may be on the order of 50 nm or less.

Thus there is a need for a sensor that includes pixel detectors responsive to wavelengths in a first spectral band, such as RGB wavelengths, and that also includes pixel detectors responsive to preferably Z data in a second spectral band, preferably NIR wavelengths. Preferably such sensor array should be implementable on a single IC substrate.

The present invention provides such a sensor.

BRIEF SUMMARY OF THE INVENTION

The present invention provides a sensor that includes an array region of high resolution pixel detectors that are responsive to wavelengths in a first spectral band (such as RGB wavelengths) used to generate an image that preferably is an RGB image, and that also includes an array region of typically lower resolution pixel detectors that are responsive to wavelengths in a second spectral band (preferably but not necessarily NIR) used to acquire Z data. If desired, wavelengths of the second spectral band (used to acquire Z data) may overlap with wavelengths of the first spectral band (used to acquire an RGB image.) It is desired to acquire a good resolution RGB image of a target object a distance Z away, and to also use Z data to rapidly identify what and where the target object is.

In one embodiment, the sensor includes two discrete arrays, each on a separate substrate: one array senses first spectral band wavelengths, for example RGB to provide an RGB image, and another array senses second spectral band wavelengths, for example NIR wavelengths to provide Z data. Pixel sensor resolution in such an embodiment between the two arrays may be on the order the difference in cross-sectional pixel detector dimension, e.g., about 10:1. An RGB array may be provided with RGB color filters, and if implemented as a BW array, with an IR blocking filter. The discrete Z sensing array may include a single low performance filter and preferably at least some pass band filtering for the Z sensing array is done in the optical path for the overall sensor.

In another embodiment, a single integrated circuit substrate includes an array of pixel sensors responsive to first spectral band wavelengths, e.g., RGB wavelengths, and also includes an array of pixel sensors responsive to second spectral band wavelengths, e.g., NIR wavelengths. One array provides an RGB image, while the other array provides Z data. Advantageously this embodiment is implementable on a single CMOS IC substrate.

In the various embodiments, incoming optical energy from a target object includes wavelengths from both the first and second spectral bands (which bands may overlap), and preferably these wavelengths will include both RGB and preferably NIR components. In some embodiments, this energy is presented to at least one optical splitter that may be implemented as a wavelength-discriminating mirror, for example a hot mirror or a cold mirror. In another embodiment, a half-mirror (e.g., a mirror that reflects perhaps 40% to perhaps 60% of incoming optical energy) acts as the optical splitter. In these embodiments, the optical splitter operates passively to output an RGB image and a preferably NIR image. The RGB image may be focused upon an RGB pixel detector array, while the preferably NIR image may be focused upon a Z pixel detector array.

Output from even a relatively low resolution pixel detector array acquiring Z data using preferably NIR wavelengths may be used to determine size, distance Z to the target object, and target object velocity $\Delta Z/\Delta t$. The Z data aids in rapidly identifying a target object imaged by the preferably RGB array.

The single chip red, green, blue, distance of the present invention has other features and advantages which will be apparent from or are set forth in more detail in the accompanying drawings, which are incorporated in and form a part of this specification, and the following Detailed Description of the Invention, which together serve to explain the principles of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 2:
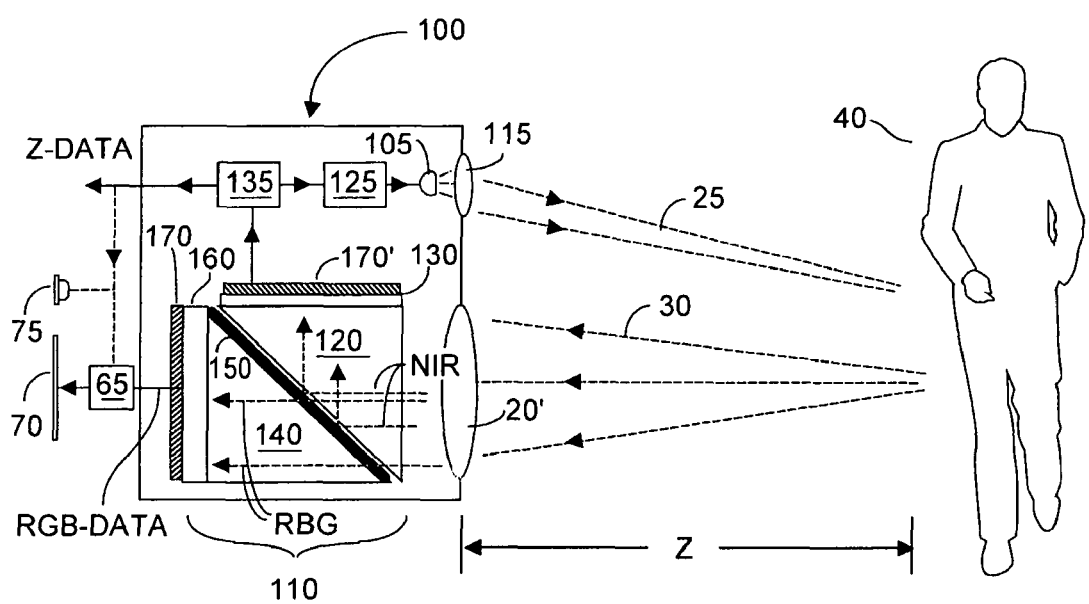
FIG. 2 depicts a first embodiment of an RGB-Z sensor, according to the present invention.

FIG. 2 depicts a camera system 100 that includes a preferably RGB-Z sensor 110, according to the present invention. As will now be described, RGB-Z sensor 110 includes an array 160 of high resolution pixel detectors responsive to wavelengths in a first spectral band, preferably RGB wavelengths, and an array 130 of lower resolution pixel Z detectors responsive to wavelengths in a second spectral band. The second spectral band may or may not overlap with the first spectral band, and is preferably NIR wavelength so as to be unobtrusive to the human eye. Roughly speaking, operating bandwidth of the first spectral band may be in the range of about 400 nm to about 900 nm, and preferably in the range of about 450 nm to about 650 nm. (As a practice matter, these wavelength limits are governed by the response of pixel diode detectors that can be implemented upon a silicon substrate.) It is understood that not all of these wavelengths need be present or used, and that the term RGB is understood to include subsets of wavelengths within the approximate range 450 nm to about 650 nm. For example, a sensor might be designed to detect and generate image data from incoming optical energy of a single color. If the second spectral band is implemented using IR or near IR wavelengths, then the operating wavelength will be about 800 nm with a bandwidth of perhaps 50 nm. These wavelengths and bandwidths are understood to be exemplary. From a practical standpoint, wavelengths closer to NIR are preferred for ease of implementing a Z detector on a silicon substrate.

Sensor 110 preferably includes optically transparent structures 120 and 140 that may, without limitation, be air, plastic, glass, among other materials. For ease of illustration, structures 120 and 140 are shown slightly spaced apart; however such spacing-apart is not necessary and spacing apart may result in undesired reflections. Adjacent an output surface of structure 120 is a first array of pixel detectors, here distance or Z-sensor 230. This first array of pixel detectors 130 is responsive to preferably NIR wavelength radiation, and is formed on a first IC substrate 170'. Output from preferably NIR array 130 yields Z data, which data, without limitation, can yield information regarding target object 40 including distance Z, size, shape, and velocity.

Sensor 110 further includes a beam splitting structure 140, which is shown as a wavelength-discriminating mirror, here an exemplary hot mirror surface 150. An output surface of structure 140 interfaces with a second array of pixel detectors, here RGB array of pixel detectors 160 fabricated upon a second IC substrate 170. The output from RGB pixel detector array 160 may be used to produce an RGB output image 70 that may be presented on an electronic display, printed on a medium such as paper, among other modes of display.

In the embodiment shown in FIG. 2, an active source for the detected second spectral band energy is provided. System 100 includes an optical emitter 105, whose optical 25 output passes through optional lens 115 to be focused generally towards the direction of a target object Z. In one embodiment, emitter 105 is an NIR diode, emitting wavelengths of about 800 nm with a power of perhaps 0.5 W to 3 W, depending upon the application at hand. Other devices emitting other wavelengths and power may of course be used, although advantageously NIR emitting diode devices are relatively inexpensive. Emitter 105 output preferably is modulated responsive to a modulator unit 125. Modulation, which may include pulsing, may be in the range of perhaps 10 MHz to perhaps 100 MHz, with a duty cycle of perhaps 50%. Modulator units 125 having other modulation characteristics could instead be used and the values and wavelengths recited above are exemplary.

In the embodiment shown, structure 140 includes a wavelength-discriminating mirror structure shown here as a hot mirror that includes a hot mirror surface 150. Hot mirrors are known in the art and have the characteristic of reflecting "hot" energy components, which is to say NIR components, while passing relatively unattenuated shorter wavelength optical energy components, here RGB components. A wavelength of about 700 nm typically demarks whether structure 140 passes or reflects incoming optical energy. If the incoming wavelength is longer than about 700 nm, the energy is NIR and is reflected by structure 140 into structure 120 for detection by NIR array 130. If the incoming wavelength is less than about 700 nm, the energy is RGB and passes through structure 140 for detection by RGB array 160. Depending upon how structure 140 is designed, the demarcation wavelength may be somewhat greater than or shorter than the exemplary 700 nm described above. Thus energy emitted by emitter 105 (e.g., wavelength preferably of about 800 nm) that is at least partially reflected by target object 40 will be reflected by surface 150 into NIR detector array 130, e.g., an array responsive to spectral energy of a second spectral band.

Those skilled in the art will appreciate that splitting structure 140 may be implemented with a cold rather than a hot mirror. In such an embodiment, the location of arrays 130 and 160 would be interchanged as incoming RGB wavelengths would now be reflected, and incoming NIR wavelengths would now be passed by cold mirror surface 150.

As noted, the size of individual pixel detectors in Z preferably NIR detector array 130 will be substantially larger than the size of individual pixel detectors in RGB detector array 160. The size disparity will be on the order of perhaps ten in terms of cross-sectional dimension, which is to say on the order of perhaps one-hundred in terms of cross-sectional area. In practice, the resolution of RGB array 160 may be substantially better than that of Z detector array 130. By way of example, RGB array 160 may be implemented with 640 pixel rows and 480 pixel columns, whereas Z detecting preferably NIR array 130 may be implemented with 64 rows and 48 pixel columns. It is to be understood that the above noted resolution numbers are exemplary and embodiments using other resolution values may of course be implemented without departing from the spirit of the present invention.

In FIG. 2, Z information sensed by the second spectral band pixel detector array 130 may be passed to a Z processor 135 that outputs Z data such as distance Z, size (breadth, height) of target object 40, as well as velocity ΔZ/Δt of the target object. Methods and hardware for processing Z type information are known in the art. U.S. Pat. No. 6,515,740 to Bamji et al. (issued Feb. 4, 2003) describes some exemplary techniques, the entire content of which patent is incorporated herein by this reference.

RGB information output from the first spectral band pixel diode detector array 160 can be coupled to an image processor, here RGB processor unit 65, whose output can be displayed electronically and/or on medium (e.g., paper) 70. Notwithstanding that resolution of the Z data is lower than that of the image (here RGB) data, the Z data can still be highly useful in rapidly identifying the target object imaged by unit 70. Z data can be coupled to RGB processor unit 65 to augment display 70, for example to display warnings, perhaps expending red concentric circles emanating from the image of the target object, and/or warning signs and words. Z data may also be coupled to help focus lens 20' to improve quality of the display 70. Audible warning sounds and/or enunciated words may also be emitted, e.g., from transducer 75. Although the embodiment of FIG. 2 works well, it is noted that the two sensor arrays of pixel detectors 130, 160 are formed on two discrete IC substrates, 170', 170. By contrast, as described below, the embodiment of FIG. 3 can be implemented on a single substrate.

Figure 3:
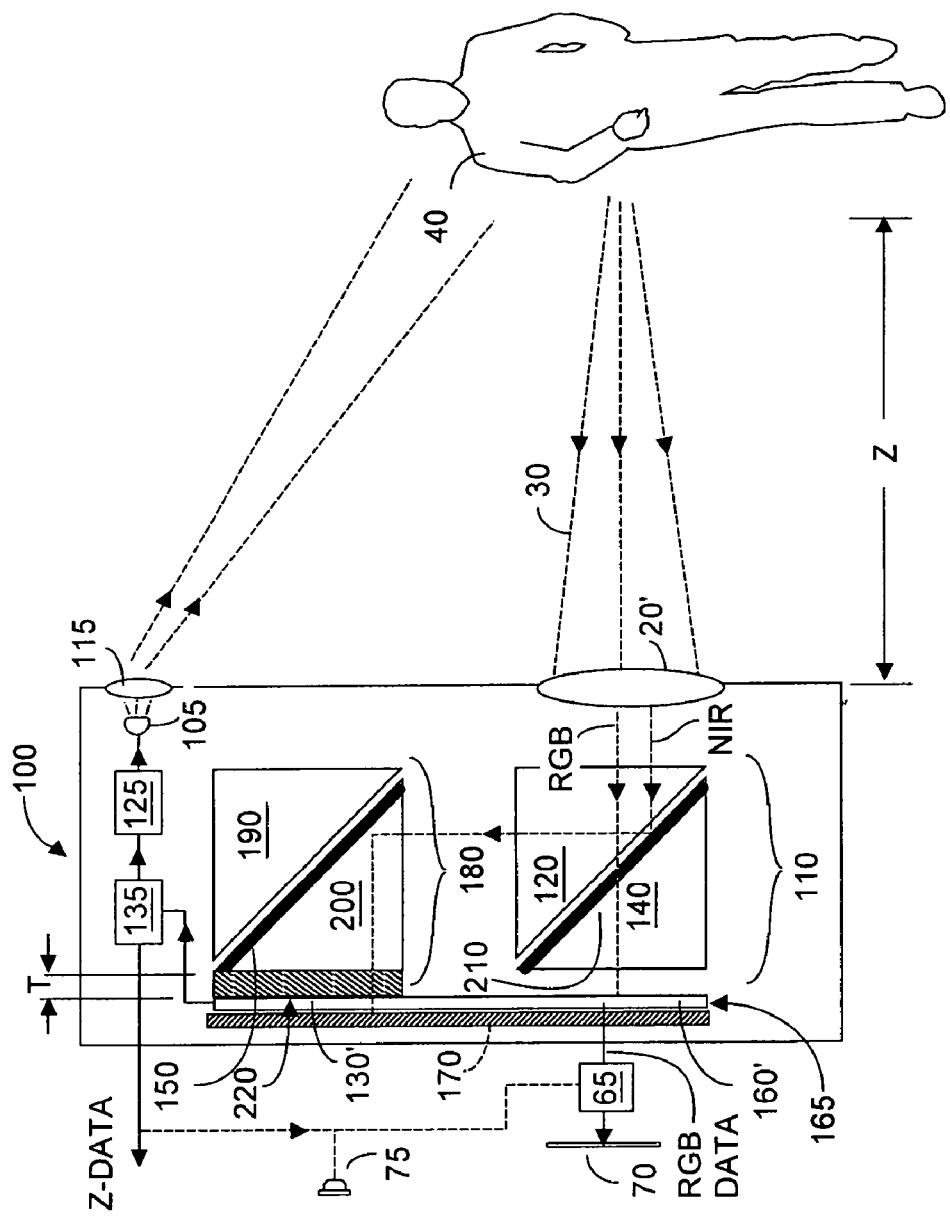
FIG. 3 depicts a second embodiment of an RGB-Z sensor in which a single IC substrate is used to fabricate first and second spectral band arrays, according to the present invention.

FIG. 3 depicts another embodiment of a camera system 100 that includes an RGB-Z sensor system comprising first and second spectral band RGB-Z sensors 110, 180, implemented on a single IC substrate 170, according to the present invention. Unless stated otherwise, elements in FIG. 3 that were described with reference to FIG. 2 may be considered to be the same elements in FIG. 3. In this embodiment RGB and Z images are focused by common lens 20' onto a single sensor 165 formed on single IC substrate 170. As described below, sensor array 165 includes a first spectral band pixel sensor array portion 160' (preferably an RGB detector), and a second spectral band pixel sensor array portion 130' (preferably an NIR detector). As noted above, resolution of the two pixel sensor array portions may differ substantially while still providing useful Z information.

In FIG. 3, optical energy 30 passes through a common lens 20' and passes through optical structure 120, with a path that defines an optical axis that in this embodiment coincides with the boresight axis. Note that in this embodiment, the optical or boresight axis is perpendicular to the focal plane defined by substrate 170, which includes image and Z detectors 160', 130', Adjacent structure 120 is a splitter structure 140 that is preferably an optically transparent structure. (As was the case with structure 120 in FIG. 2, "optically transparent structure" is understood to include a structure that may be air, plastic, glass, among other materials.)

In the embodiment shown, splitter structure 140 includes a frequency-discriminator mirror surface, here exemplary hot mirror surface 210. As a result, incoming optical energy that is "hot" or includes preferably NIR components is reflected by surface 210 into a reflecting system 200 in assembly 180. Z components, preferably NIR wavelengths, reaching assembly 180 are reflected, by surface 150, here an exemplary ordinary mirror. If desired, a cold rather than a hot mirror surface may be used, with suitable interchange of the two sensor regions upon IC substrate 170.

As shown in FIG. 3, reflected components preferably pass through an optical path length equalizer element 220 before being detected by Z detecting pixel array detector portion 130' of array 165, formed on a common IC substrate 170. Depending upon the index and thickness of elements 200 and 190 and the optical and focus considerations the path length equalizer may be on either of the optical paths. Output from preferably NIR pixel array detector portion 130' is Z data, which data can be used to provide size and distance and other parameters regarding target object 40. Z data may be used to help accurately identify the nature of target object 40. In some applications, Z data may be used to improve quality of image 70, for example by improving focus of lens 20', and/or by using Z data and imaging processing techniques to de-blur image 70. In the embodiment of FIG. 3, it is understood that a cold mirror rather than a hot mirror may be used as element 140 if the location of array portions 130' and 165 are interchanged.

To summarize, in the embodiment of FIG. 3, RGB components of incoming optical energy passing through lens 20' will pass relatively unattenuated through elements 120 and 140 to be detected by the RGB pixel array detector portion 160' of common IC substrate 170. Preferably NIR components, however, are reflected by surfaces 210 and 150 to be detected by the Z pixel array detector portion 130' on the common IC substrate 170. As such substrate 170 may be considered to include an overall array 165 that includes array portions 130' and 160'.

As in earlier described embodiments, the RGB or display output from detector portion 160 may be used to present an output image 70 representing the target object 40. Identification characteristics of target object 40 within output image 70 may be enhanced using Z data, including without limitation the display of warning colors in image 70, highlighting at least a portion of the display of target object 40. Further Z data may be used to sound audible alarms, to generate feedback signals, perhaps to the braking system and/or headlight system in a motor vehicle that includes system 100 as part of a driving hazard warning system.

In general the optical path associated with one of the Z and the RGB components will be longer than the other path. In the configuration of FIG. 3, an optical path length equalizer element 220 is included to optically equalize the two paths and depending on the index and thickness of 190 and 200 it may be placed on either of the two paths. Equalizer element 220 may be a substantially flat piece of high index material, glass for example, and the inclusion of equalizer element 220 makes objects in the longer optical path appear closer. The result is that a common focal plane exists for the RGB and the Z images formed on respective detector regions 160', 130' on overall array 165 formed on substrate 170. However since the support structure for hot, cold, or ordinary mirror surfaces present in the invention may in fact include glass, in some applications the need for a separate discrete optical path length equalizer may be eliminated.

If desired, equalizer element 220 may be implemented using optics, e.g., a converging and/or diverging lens, to move the focal point of the longer optical path forward. Equalizer elements similar to element 220 may be disposed at various locations in the two optical paths. In FIG. 3, a single planar equalizer element 220 is shown. Assume that the material comprising this element has a high index n, and that the difference in path length between the two optical paths due to the beam splitter(s) is D. In this example, the front-back thickness of element 220 is T, where $T=D/(n-1)$. By way of example, if D=5 mm (in air), and n=1.65, then the thickness T of element 220 will be $T=5$ mm$/(1.6-1)=8.3$ mm.

In practice, thickness T may be rather large compared to the numerical aperture of lens 20' and thus spherical aberration can occur. The effects of spherical aberration may be mitigated maintaining RGB image sharpness at the expense of the Z image focus for example by inserting a flat element 220 which generate aberrations in front of the NIR pixel sensor array 130', which array 130' typically has larger sized pixels than the RGB array 160'. Alternatively a correction lens may be included in the optical path. If either the RGB or the Z optical path includes a substantial path through high index material (e.g., $n \geq 1.2$ or so) resultant spherical aberration can be reduced by including a correction lens on one of the paths, preferably the path with the aberration.

Optical path length equalizers such as 220 will introduce some optical aberrations, which aberrations will be less perceptible if applied to the Z array, which will usually be designed with lower resolution than the RGB array. Thus if one of the optical paths is to be compromised, less degradation occurs if the Z path is impacted. It will be appreciated that if a high performance bandpass filter that passes a narrow band of frequencies centered at the operating wavelength of the Z sensor illumination may be included along the Z optical path to improve performance. An exemplary high performance bandpass filter might have at least one of the following characteristics: a bandpass as narrow as perhaps 40 nm),  passband attenuation as low as perhaps $\leq 5\%$), and, and a stopband attenuation as high as perhaps $\geq 95\%$.

Figure 4:
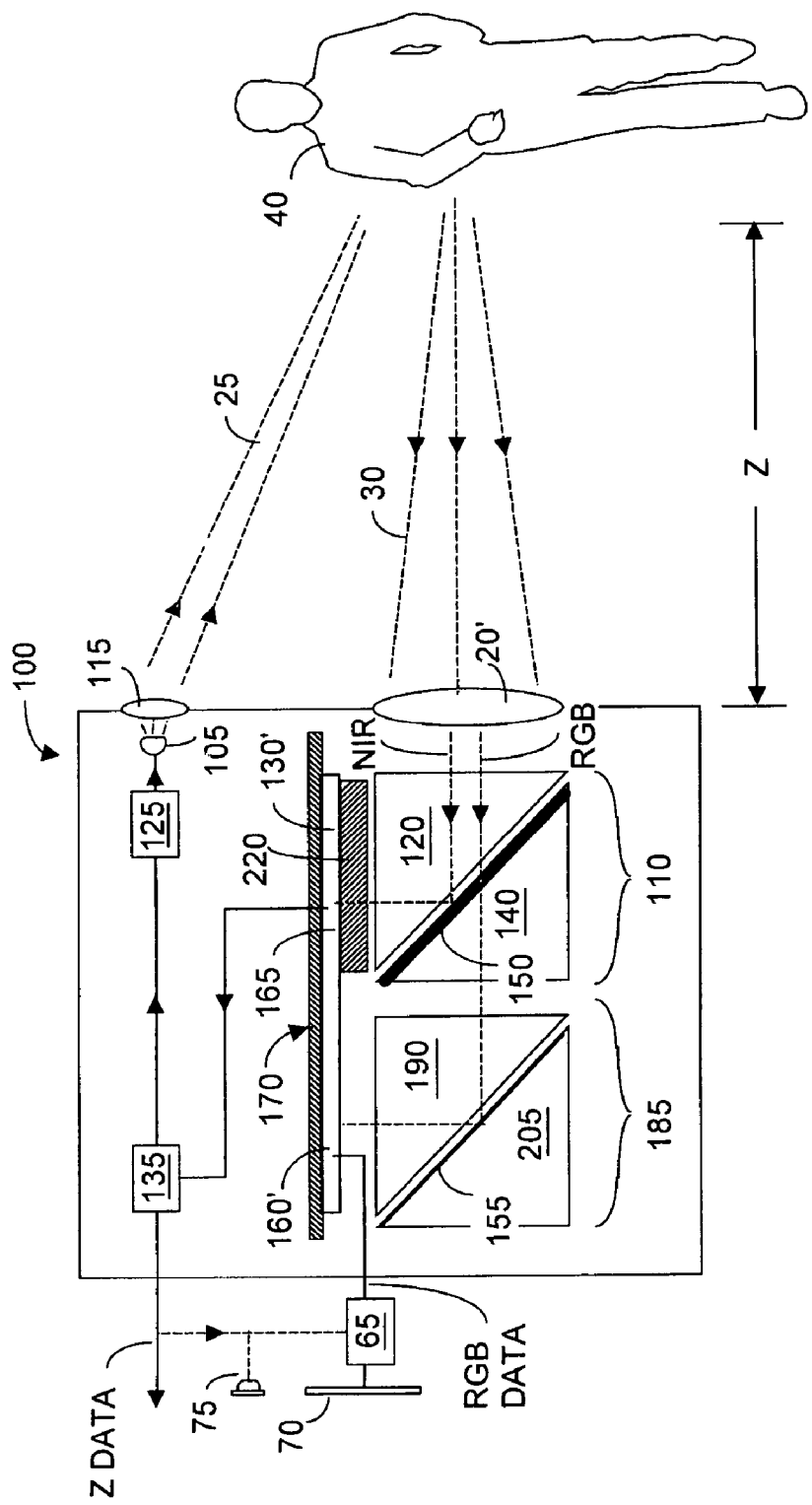
FIG. 4 depicts a third embodiment of an RGB-Z sensor fabricated on a single substrate IC in which the focal plane is parallel to the bore sight axis, according to the present invention.

FIG. 4 shows yet another embodiment of a camera system 100 that includes an RGB-Z sensor system comprising first and second spectral band RGB-Z sensor regions 160', 130', associated with splitter unit 110 and reflecting unit 185, according to the present invention. As with the configuration of FIG. 3, in this embodiment RGB and Z images are focused by common lens 20' onto respective RGB and Z pixel array detector regions 160', 130' formed on a single sensor array 165 that is fabricated on a single IC substrate 170. A description of components 105, 115, 125, 135, 65, and 75 need not be repeated here. As described below, sensor array 165 includes an image, preferably RGB, detector pixel sensor array portion 160' and a Z detector pixel sensor array portion 130'.

In contrast to the configuration of FIG. 3, the embodiment of FIG. 4 uses a focal plane parallel to the bore sight axis, e.g., the detector plane defined by substrate 170 is parallel to the optical axis defined by optical energy passing through lens 20'. In FIG. 4, system 100 includes a beam splitter 110, comprising elements 120, 140, and exemplary hot mirror surface 150, as has been described earlier herein. Beam splitter 110 reflects Z components through element 120, through equalizer element 220 into Z pixel sensor array region 135' on detector sensor array 165, which is formed on IC substrate 170.

In FIG. 4, Z components pass substantially through beam splitter 110 into element 185 comprising a spacer 120, which as noted may be air, plastic, glass, among other materials, into a beam reflector 205 that includes a reflecting mirror surface 155. Thus, preferably NIR energy falling upon element 185 will be reflected through spacer material 190, which may be air, plastic, glass, etc., into Z pixel detector array portion 160' of detector sensor array 165, formed on IC substrate 170.

The RGB components are reflected from beam splitter 120 onto RGB array 135'. Output from detector portion 135', as in earlier described embodiments, may be used to present an output image 70. Information presented in output image 70 may be enhanced using Z data obtained from the NIR sensor region 160'. Path length equalizer element 220 helps ensure that both images are focused in the same plane.

It will be appreciated that if the Z data sensor array operates at a wavelength in the RGB band rather than at NIR wavelengths, then a half mirror instead of a beam splitter may be used in the embodiments of FIGS. 2-4. In such mode of operation, wavelengths in the operating spectra of the Z sensor will be split between the RGB and Z sensors. If desired, other wavelengths may be split or transmitted to the RGB sensor using a combination of splitter and half mirror devices, although in practice using only a half mirror may suffice, for reasons of simplicity and economy. Thus, in FIGS. 2-4, surface 150 would now be a half-mirror rather than a wavelength splitter. As noted above with respect to a beam splitter, a high performance filter may be added to the optical path associated with the Z array. The use of other than NIR wavelengths to acquire Z data permits the use of optical energy generated by a target object itself. For example in the near future motor vehicle headlights will be high intensity LEDs. If such headlights include a modulated light component, the present invention can acquire Z data by sensing the modulated LED wavelength. (It is assumed here that the motor vehicle manufacturers will be motivated to include modulated LED light components in the headlight output.) In this case Z data could be acquired from a pedestrian or other target object illuminated only by the LED headlights of a vehicle carrying the present invention, without the need to provide an additional second spectral band illumination source.

Figure 5:
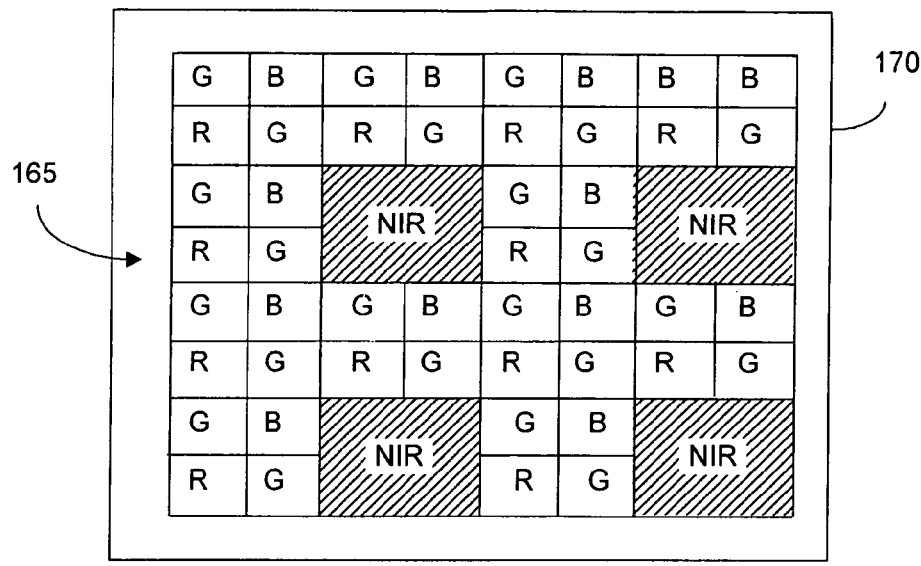
FIG. 5 is a plan view of an embodiment of an RGB-Z sensor in which image pixel detectors and Z pixel detectors are interspersed in a common RGB-Z sensor array implemented on a single IC substrate, according to the present invention.

FIG. 5 is a plan view depicting a configuration of sensor array 165 in which first spectral band detector regions 160' comprising R,G,B pixel detectors and second spectral band detector regions 130' comprising, here, NIR pixel detectors are interspersed on common IC substrate 170. To avoid cluttering the figure, regions 160' and 130' are not specifically identified. However the cross-hatched (NIR) regions are regions 130', and the R,G,B regions are regions 160'. As noted, the dimensions of the Z detecting regions (here, NIR) will be substantially larger in size than the RGB detecting regions, perhaps ten times larger in size, which is to say perhaps one-hundred times larger in cross-sectional area. In practice, the presence of the substantially larger NIR pixel detectors will cause symmetry dislocations within array 165.

Figure 6:
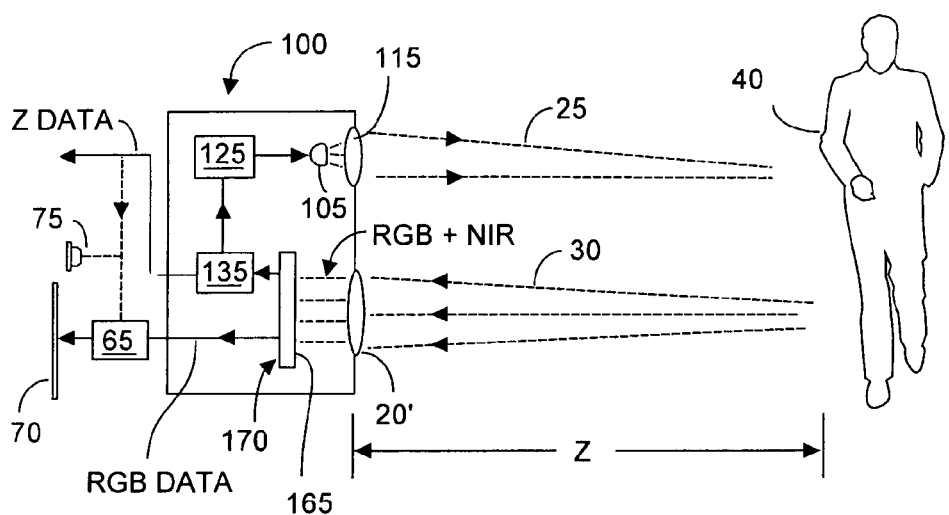
FIG. 6 depicts a fourth embodiment of an RGB-Z sensor fabricated on a single IC substrate, utilizing an sensor array depicted in FIG. 5, according to the present invention.

FIG. 6 depicts an embodiment of an RGB-Z sensor 100 that uses a sensor array 165 as depicted in FIG. 5. Incoming optical energy 30 passing through common lens 20' will include first and second spectral band components, here RGB and NIR components. RGB and NIR optical energy is focused upon array 165. Portions of RGB energy that fall upon RGB pixel diode sensors are detected by that portion of the array. Similarly portions of NIR energy that fall upon NIR pixel diode sensors are detected by that portion of the array. The respective outputs from the RGB and the NIR pixel diode sensors are coupled respectively to RGB processor 65 and to Z processor 135, as described earlier herein. The function of components 105, 125, 65, and 70 have been described with respect to other embodiments, and need not be further described.

Various embodiments of the present invention advantageously combine the high optical efficiency associated with splitters, with the economy of fabricating an RGB-Z sensor on a single IC substrate. As such, an RGB-Z sensor according to the present invention can be cost competitive with prior art RGB or image sensors, while providing more useful information by sensing additional components of optical energy, for example NIR.

Figure 7:
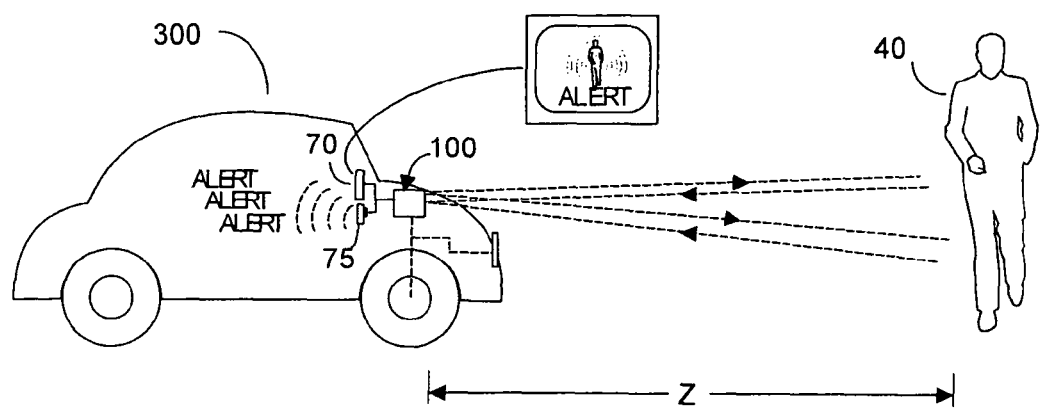
FIG. 7 depicts a pedestrian recognition and avoidance application of the present invention, using an RGB-Z sensor according to the present invention.

FIG. 7 depicts an exemplary application of the present invention, namely use in a motor vehicle to identify objects, such as detecting a pedestrian in the vehicle's path. Thus a motor vehicle 300 is shown equipped with an RGB-Z sensor system 100, according to the present invention. In this embodiment, system 100 outputs optical energy to acquire Z data (preferably NIR), and detects both reflected such optical energy, as well as preferably RGB wavelengths reflected from target object 40 from ambient light (perhaps sun light, not shown).

Pedestrian detection involves identifying the shape and size of an object in front of a motor vehicle to determine whether the object is a pedestrian. A pedestrian may be deemed to be an object with size about 1.5 m×40 cm with a shape defining legs at the object bottom. High resolution BW or RGB is used to determine the shape of the object. Lower resolution Z is sufficient to determine the distance Z to the object because the object size spans many RGB pixel detectors on a detector array, and hence at least one Z pixel detector. If the shape and distance of the target object can be acquired using the present invention then the size can be determined also. It then becomes relatively easy to determine from the acquired data whether the target object is a pedestrian and if so, to alert the operator of a motor vehicle containing the present invention.

Figure 1:
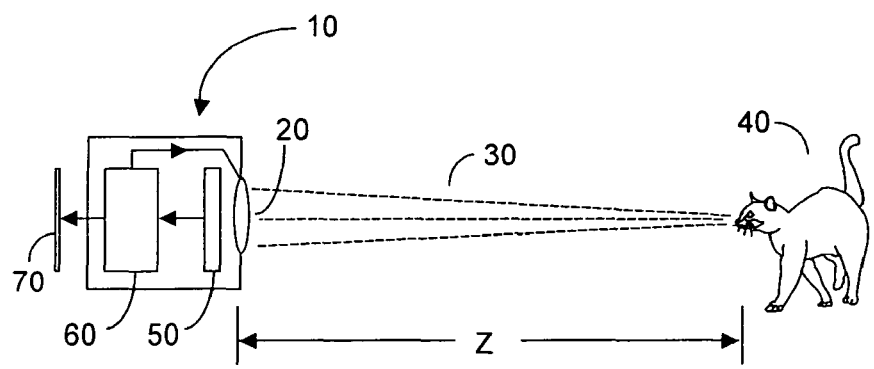
FIG. 1 depicts a camera system using a conventional RGB sensor, according to the prior art.

Thus in FIG. 7, Z processor 135 can augment RGB data presented to RGB processor 65, for use in determining whether target object 40 is a pedestrian. Z processor 135 may include memory storing parameters of what a "pedestrian" should look like with respect to size, shape, range of velocities, etc. If the determination is made that target object 40 is a pedestrian, then the present invention can be used to enhance image 70, and/or sound audible signals (audible to the operator of vehicle 300 and perhaps also audible to the target object, e.g., sound the vehicle's horn). In addition, the present invention can output feedback signals useable to automatically brake the vehicle and/or apply or flash the vehicle headlights, to alert the pedestrian to danger from vehicle 300. These functions can be implemented more reliably than if an ordinary prior art camera system such as shown in FIG. 1 were used. These functions can be performed with much greater resolution than if ultrasound techniques were employed, and at far less cost and with better spatial resolution than if GHz range radar systems were employed. In practice, exemplary range resolution using the present invention can be about 3 cm to about 20 cm, within a range of perhaps 1 m to about 25 m.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A CMOS-implementable sensor useable with a time-of-flight (TOF) system that includes an emitter that emits optical energy in an emitter optical path toward a target object, emitted said optical energy including a second spectral band comprising non-visible wavelengths, a fraction of which emitted said optical energy is reflected from said target object a distance Z away from said TOF system, said sensor detecting target object reflected optical energy components, including optical energy in a first spectral band comprising visible wavelengths to image said target object, and target object reflected optical energy components emitted by said emitter in said second spectral band to determine at least magnitude of said Z, said TOF system acquiring magnitude of said distance Z without a shutter, the sensor comprising:

an optical splitter disposed with respect to said emitter optical path to receive, incoming to said TOF system, reflected optical energy components in said first spectral band including red, green, and blue components, and target object reflected optical energy components in said second spectral band, and to substantially pass optical energy components in said first spectral band and to substantially reflect optical energy components in the said second spectral band, said optical splitter so disposed thus receiving incoming optical energy reflected from external to said TOF system without receiving optical energy emitted by said emitter that has not been so reflected;

an image sensor disposed to detect components from said first spectral band output from said optical splitter, optical energy components in said first spectral band including red, green, and blue components and being detected by sensors disposed in a single plane relative to one another, and to output display data useable to display at least a portion of said target object;

a Z sensor disposed to detect components from said second spectral band output by said optical splitter and to output Z data useable to determine at least magnitude of said Z;

said image sensor and said Z sensor are formed on a common integrated circuit (IC) substrate, a plane of said IC substrate being parallel to an optic axis defined by components of said first spectral band and said second spectral band input to said optical splitter so as to define a common boresight.

2. The sensor of claim 1, wherein said optical splitter is selected from a group consisting of (a) a hot mirror, (b) a cold mirror, (c) a half mirror, and (d) a fully reflective mirror.

3. The sensor of claim 1, wherein said first spectral band comprises at least one group of wavelengths selected from a group consisting of (i) red, green, blue (RGB) wavelengths, and (ii) wavelengths in a range of 400 nm to 650 nm, and wherein said second spectral band comprises at least one group of wavelengths selected from a group consisting of (i) IR wavelengths, (ii) near IR (NIR) wavelengths, and (iii) a wavelength of 800 nm.

4. The sensor of claim 1, wherein:
said image sensor includes a first plurality of red, green, blue (RGB) pixel detector diodes formed on an IC substrate and defining an RGB detection resolution;
said Z sensor includes a second plurality of Z pixel detector diodes formed on said IC substrate and defining a Z detection resolution different from said RGB detection resolution.

5. The sensor of claim 4, wherein a cross-sectional area defined by one of said Z pixel detector diodes is substantially larger than a cross-sectional area defined by one of said RGB pixel detector diodes.

6. The sensor of claim 1, further including means for substantially equalizing any discrepancy in optical path length within said sensor between a first optical path defined by components of said first spectral band and defined by a second optical path defined by said components of said second spectral band.

7. The sensor of claim 6, wherein said means for substantially equalizing includes an element having an index of refraction $n \geqq 1.2$, disposed in at least one of said first optical path and said second optical path.

8. The sensor of claim 1, further including means for displaying an image from an output of said image sensor.

9. The sensor of claim 1, further including means for determining, from an output of said Z sensor, at least one of (a) magnitude of said distance Z, (b) magnitude of $\Delta Z/\Delta t$ of said target object, (c) approximate shape of at least a portion of said target object, and (d) approximate size of at least a portion of said target object.

10. The sensor of claim 1, further including:
means for displaying an image from an output of said image sensor;
means for determining, from an output of said Z sensor, at least one of (a) magnitude of said distance Z, (b) magnitude of $\Delta Z/\Delta t$ of said target object, (c) approximate shape of at least a portion of said target object, and (d) approximate size of at least a portion of said target object; and
means, coupled to an output of said means for determining, for augmenting information displayed on said image.

11. The sensor of claim 10, wherein said means for augmenting includes at least one augmentation selected from a group consisting of (a) visually highlighting a portion of said image, (b) displaying an image of a warning on said display, (c) sounding an acoustic alarm, (d) outputting a signal useable to activate a safety system in a motor vehicle containing said sensor.

12. A CMOS-implementable sensor useable with a time-of-flight (TOF) system that includes an emitter that emits optical energy in an emitter optical path toward a target object, emitted said optical energy including a second spectral band comprising non-visible wavelengths, a fraction of which emitted said optical energy is reflected from said target object a distance Z away from said TOF system, said sensor detecting target object reflected optical energy components, including optical energy in a first spectral band comprising visible wavelengths an optical splitter disposed with respect to said emitter optical path to receive, incoming to said TOF system, reflected optical energy components in said first spectral band including, red, green, and blue components, to image said target object, and target object reflected optical energy components emitted by said emitter in said second spectral band to determine at least magnitude of said Z, said TOF system acquiring magnitude of said distance Z without a shutter, the sensor comprising:
an optical splitter disposed with respect to emitter optical path to receive, incoming to said TOF system, reflected optical energy components in said first spectral band and target object reflected optical energy components in said second spectral band, and to substantially pass optical energy components from one said spectral band and to substantially reflect optical energy components from the other said spectral band, said optical splitter thus receiving incoming optical energy reflected from external to said TOF system without receiving optical energy emitted by said emitter that has not been so reflected;
an image sensor comprising image pixel detector diodes disposed on an integrated circuit (IC) substrate to detect components in said first spectral band that are output from said optical splitter, optical energy components in said first spectral band being detected by sensors disposed in a single plane relative to one another, and to output display data useable to display at least a portion of said target object; and
a Z sensor comprising Z pixel detector diodes disposed on said IC substrate to detect components in said second spectral band that are output from said optical splitter and to output Z data useable to determine at least magnitude of said Z, said Z pixel detector diodes are interspersed among said image pixel detector diodes;
wherein a plane of said IC substrate is parallel to an optic axis defined by components of said first spectral band and said second spectral band.

13. The sensor of claim 12, wherein said optical splitter includes at least one splitter selected from a group consisting of a hot mirror, a cold mirror, a half mirror, and a fully reflective mirror.

14. The sensor of claim 12, wherein said first spectral band comprises at least one group of wavelengths selected from a group consisting of (i) red, green, blue (RGB) wavelengths, and (ii) wavelengths in a range of 400 nm to 650 nm, and wherein said second spectral band comprises at least one group of wavelengths selected from a group consisting of (i) IR wavelengths, (ii) near IR (NIR) wavelengths, (iii), and a wavelength of 800 nm.

15. The sensor of claim 12, further including:
means for displaying an image from an output of said image sensor;
means for determining, from an output of said Z sensor, at least one of (a) magnitude of said distance Z, (b) magnitude of $\Delta Z/\Delta t$ of said target object, (c) approximate shape of at least a portion of said target object, and (d) approximate size of at least a portion of said target object; and means, coupled to an output of said means for determining, for augmenting information displayed on said image.

16. A CMOS-implementable sensor useable with a-time-of-flight (TOF) system that includes an emitter that emits optical energy in an emitter optical path toward a target object, emitted said optical energy including a second spectral band comprising non-visible wavelengths, a fraction of which emitted said optical energy is reflected from said target object a distance Z away from said TOF system, said sensor detecting target object reflected optical energy components, including optical energy in a first spectral band comprising visible wavelengths including red, green, and blue components, to image said target object, and target object reflected optical energy components emitted by said emitter in said second spectral band to determine at least magnitude of said Z, said TOF system acquiring magnitude of said distance Z without a shutter, the sensor comprising:

an integrated circuit substrate having formed thereon image pixel detector diodes disposed with respect to said emitter optical path to receive and to detect, incoming to said TOF system, reflected optical energy components in said first spectral band including red, green, and blue components, and having formed thereon Z pixel detector diodes, interspersed among said image pixel detector diodes to detect target object reflected optical energy components in said second spectral band, said integrated circuit substrate so disposed thus receiving incoming optical energy reflected from external to said TOF system without receiving optical energy emitted by said emitter that has not been so reflected, a plane of said IC substrate being parallel to an optic axis defined by components of said first spectral band and said second spectral band;

means for outputting image data from outputs of said image pixel detector diodes including red, green, and blue optical energy components, said image data useable to display at least a portion of said target object;

means for outputting Z data from outputs of said Z pixel detector diodes, said Z data useable to determine at least magnitude of said Z.

17. The sensor of claim 16, wherein:

said first spectral band comprises at least one group of wavelengths selected from a group consisting of (i) red, green, blue (RGB) wavelengths, and (ii) wavelengths in a range of 400 nm to 650 nm; and said second spectral band comprises at least one group of wavelengths selected from a group consisting of (i) IR wavelengths, (ii) near IR (NIR) wavelengths, (iii) a wavelength of 800 nm, and (iv) at least one wavelength greater than 650 nm.

18. A CMOS-implementable sensor useable to identify a target object with a time-of-flight (TOF) system that is carried by a motor vehicle and includes an emitter that emits optical energy in an emitter optical path toward said target object, emitted said optical energy including a second spectral band comprising non-visible wavelengths, a fraction of which emitted said optical energy is reflected from said target object a distance Z away from said TOF system, the CMOS-implementable sensor detecting target object reflected optical energy components including optical energy in a first spectral band comprising red, green, blue (RGB) visible wavelengths to image said target objects, and target object reflected optical energy components in said second spectral band to determine at least magnitude of said Z, said TOF system acquiring magnitude of said distance Z without a shutter, the CMOS implementable sensor comprising:

means, disposed with respect to said emitter optical path to receive, incoming to said TOF system, reflected optical energy components in said first spectral band including red, green, and blue components, and target object reflected optical energy components in said second spectral band, for substantially passing optical energy components in one said spectral band and for substantially reflecting optical energy components in the other said spectral band, said means for substantially passing and for substantially reflecting so disposed thus receiving incoming optical energy reflected from external to said TOF system without receiving optical energy emitted by said emitter that has not been so reflected;

an image sensor disposed on an integrated circuit (IC) substrate to detect first spectral band components including red, green, and blue components, output from said means for substantially passing and for substantially reflecting and to output image data useable to display at least a portion of said target object;

a Z sensor disposed on said IC substrate to detect second spectral band components output by said means for substantially passing and for substantially reflecting and to output Z data useable to determine at least magnitude of said Z, a plane of said IC substrate being parallel to an optic axis defined by components of said first spectral band and said second spectral band;

means for displaying an image from an output of said image sensor;

means for determining, from an output of said Z sensor, at least one of (a) magnitude of said distance Z, (b) magnitude of $\Delta Z/\Delta t$ of said target object, and (c) approximate shape of at least a portion of said target object, and (d) approximate size of at least a portion of said target object; and means, coupled to an output of said means for determining, for augmenting information displayed on said image by carrying out at least one of (a) visually highlighting a portion of said image, (b) displaying a warning on said image, (c) sounding an acoustic alarm, (d) outputting a signal useable to sound a horn in said motor vehicle, and outputting a signal to activate brakes in said motor vehicle.

* * * * *

UNITED STATES PATENT AND TRADEMARK OFFICE
CERTIFICATE OF CORRECTION

PATENT NO. : 8,139,141 B2  
APPLICATION NO. : 11/044996  
DATED : March 20, 2012  
INVENTOR(S) : Bamji et al.

Page 1 of 1

It is certified that error appears in the above-identified patent and that said Letters Patent is hereby corrected as shown below:

In the Drawings

In Sheet 1 of 5, line 1, delete "RBG" and insert -- RGB --, therefor.

In the Claims

Column 12, line 61, in Claim 14, delete "(iii), and" and insert -- and (iii) --, therefor.

Signed and Sealed this  
Third Day of February, 2015

Michelle K. Lee  
*Deputy Director of the United States Patent and Trademark Office*